Jan. 25, 1927. 1,615,771
E. PETERS
ILLUMINATED LICENSE PLATE
Filed Sept. 12, 1923
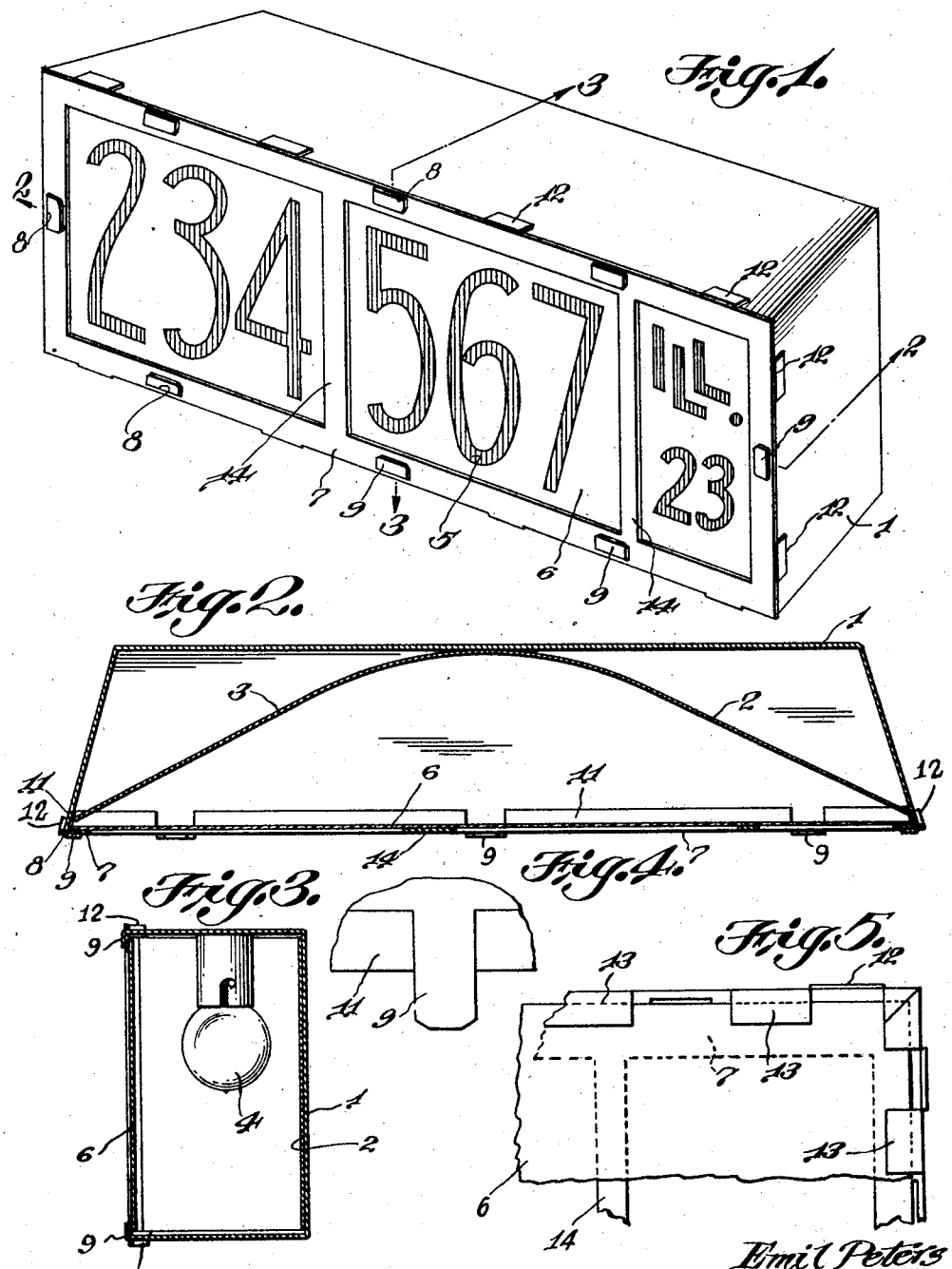

Patented Jan. 25, 1927.

1,615,771

UNITED STATES PATENT OFFICE.

EMIL PETERS, OF CHICAGO, ILLINOIS.

ILLUMINATED LICENSE PLATE.

Application filed September 12, 1923. Serial No. 662,314.

This invention relates to illuminated license plates for motor vehicles and an object of the invention is to provide a license plate and means for illuminating it whereby the license number may be easily and distinctly read at night time, in dark places, and at a comparatively great distance.

It is a well known fact that with the present type of license plates in use they, after continuous use, become soiled and it is hard to read them correctly for any distance and it is practically impossible to read them at night.

It is an object of this invention to provide means which will overcome the inconveniences and disadvantages above related.

Other objects of the invention will appear in the following detailed description and in the accompanying drawing wherein:

Fig. 1 is a perspective view of the improved license plate carrier and illuminating means.

Fig. 2 is a horizontal section taken on the line 2—2 of Fig. 1.

Fig. 3 is a vertical section taken on the line 3—3 of Fig. 1.

Fig. 4 is a detailed view illustrating a part of the manner of constructing the license plate carrier.

Fig. 5 is a detailed view illustrating the manner of connecting parts of the carrier.

Referring more particularly to the drawing the illuminated license plate and carrier comprises a box-like body 1 which has a bowed reflector plate 2 therein, the inner surface 3 of which is highly polished or coated with any suitable reflecting material so as to reflect the light rays from the electric light bulb 4 outwardly through the transparent numbers 5 on the opaque license plate 6. Positioned in front of the reflector 2 is a plate 6 which is properly held in place by means of the frame binder 7 which extends about the edges of the license plate and is provided with spaced openings 8 along its sides and ends. The openings 8 receive tongues 9 which are cut from the body 1 and project through the openings 8 and are bent over against the outer surface of the frame 7 as clearly shown in Fig. 1, of the drawing. The edge of the body 1 is reinforced by doubling inwardly its edge portions as shown at 11, the tongues 9 being formed at spaced points from the portion 11 of the body which is doubled inwardly as shown in Fig. 4 of the drawing. The frame 7 has tongues 12 cut therefrom at spaced points which are bent transversely to the frame and engage the outer surface of the box-like body 1. The frame 7 has formed thereon intermediate the tongues 12, the tongues 13 which are bent back over the edges of the plate 6 as shown in Fig. 5 of the drawings whereby to embrace the edges of the plate 6 and be positioned flat against the inner surface of the plate for securely retaining the same in position relative to the frame 7. If found desirable the frame 7 may be reinforced by cross pieces 14.

It is, of course, to be understood that the invention may be constructed in various other manners and the parts associated in different relations, and therefore, I do not desire to be limited in any manner except as set forth in the claims hereunto appended.

Having thus described my invention what I claim is:

1. An illuminated license plate structure comprising a box-like body having one side open, illuminating means within the body, a license plate provided with transparent indicia placed at the open side of the body, said reflector adapted to be sprung into the body and held in place by spring engagement with the body, a frame connected to the body, means carried by the frame and embracing the edges of said license plate, said body being reinforced about its open side by bending back its edge portions within the body, and tongues cut from said bent back edge portions at spaced points and projecting through said frame and bent over to engage the outer surface of the frame.

2. An illuminated license plate structure comprising a box-like body having one side open, a bowed reflector plate within said body, illuminating means within the body, a license plate provided with transparent indicia placed at the open side of the body, said reflector adapted to be sprung into the body and held in place by spring engagement with the body, a frame connected to the body, means carried by the frame and embracing the edges of said license plate, said body being reinforced about its open side by bending back its edge portions within the body, and tongues cut from said bent back edge portions at spaced points and projecting through said frame and bent over to engage the outer surface of the frame, reinforcing tongues formed upon said frame, and transversely extending tongues formed along the edges of the frame at spaced points and engaging said body.

In testimony whereof I affix my signature.

EMIL PETERS.